US010315231B1

(12) United States Patent
Brazeau

(10) Patent No.: US 10,315,231 B1
(45) Date of Patent: Jun. 11, 2019

(54) ATTRIBUTE-BASED CONTAINER SELECTION FOR INVENTORY

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/698,510

(22) Filed: Sep. 7, 2017

(51) Int. Cl.
*G06F 7/00* (2006.01)
*B07C 5/38* (2006.01)
*B07C 3/00* (2006.01)

(52) U.S. Cl.
CPC ................ *B07C 5/38* (2013.01); *B07C 3/008* (2013.01)

(58) Field of Classification Search
None
See application file for complete search history.

(56) References Cited

U.S. PATENT DOCUMENTS

| | | | | |
|---|---|---|---|---|
| 8,280,547 | B2 | 10/2012 | D'Andrea et al. | |
| 9,087,314 | B2 | 7/2015 | Hoffman et al. | |
| 9,569,700 | B1 | 2/2017 | Santos et al. | |
| 9,663,294 | B2 | 5/2017 | Young et al. | |
| 9,665,960 | B1 | 5/2017 | Masters et al. | |
| 2008/0190953 | A1 * | 8/2008 | Mallett | A61L 11/00 221/13 |
| 2017/0174440 | A1 * | 6/2017 | Ripley | B07C 5/3412 |

* cited by examiner

*Primary Examiner* — Yulanda R Cumbess
(74) *Attorney, Agent, or Firm* — Kilpatrick Townsend & Stockton LLP

(57) ABSTRACT

A method of placing inventory can include accessing a data store to retrieve item attribute data of an inventory item to be placed, comparing the item attribute data of the inventory item to attribute data corresponding to each respective inventory item in a collection of potential destination containers, and selecting a particular destination container for storage based on that comparison in order to maximize the relative distinctiveness of items stored together. The storage method results in pseudo-random storage of inventory in containers where each item is more readily identifiable from each other item in the same container, particularly by automated means, and can be used in conjunction with an automated or partially automated inventory storage and retrieval system.

22 Claims, 15 Drawing Sheets

ATTRIBUTE-BASED CONTAINER SELECTION FOR INVENTORY

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, sorting, retrieving, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Inventory systems can enhance throughput by efficiently using space and by employing automation, including robotic means to lift, transport, and place inventory. One significant drawback in such automation has been the difficulty that robotic inventory handlers have in identifying specific inventory items from among collections of mixed inventory items, which may be similar to each other. This drawback competes functionally with advantages of co-locating disparate items together in an inventory system. As a result, improved methods for facilitating the retrieval of specific inventory items from groups of co-located, disparate items are desired.

Embodiments herein are directed to an inventory system configured for automated handling of inventory items. The inventory system can include various components, such as containers, inventory holders, dunnage, boxes, unmanned drive units for moving inventory items, and stations for automated handling of inventory items. Specifically, features herein are directed to selective placement of inventory items in storage containers in order to facilitate improved automated detection and access to the inventory items during subsequent processing of the inventory items. Inventory systems using these methods can include sensing apparatuses to obtain data about physical attributes of inventory items, and robotic manipulators for physically moving inventory items into storage containers. A destination container for storing an inventory item can be selected based on a determination by the inventory system that the attribute data corresponding to the inventory item is sufficiently unique relative to attribute data of items in the destination container to enable automated selection of the incoming inventory item from the destination container if the items were to be mixed. The attribute data corresponding to these physical attributes can be used to generate feature vectors that correspond to readily machine-identifiable physical attributes of the inventory items in a form readily accessed for comparison with feature vectors of other inventory items.

Figure 1:
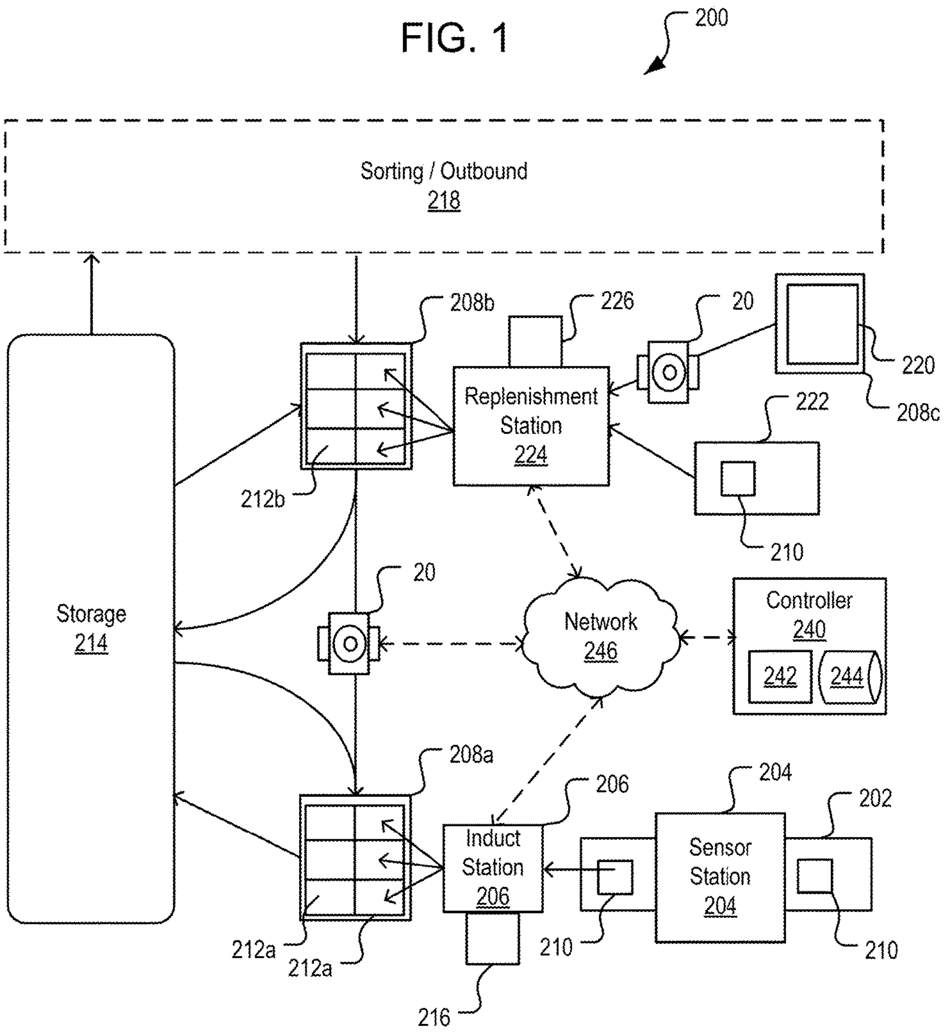
FIG. 1 is a simplified schematic diagram illustrating an example inventory system, in accordance with some embodiments.

FIG. 1 illustrates an example inventory system 200 that utilizes sorting stations to sort inventory into containers 212 for storage in an inventory facility, in accordance with some embodiments. The sorting stations can include, e.g., induct stations 206 and/or replenishment stations 224 to move inventory items into storage 214 in the inventory system. Aspects of the system 200 are directed by a management component or controller 240, which includes a processor and memory 242, 244. Specific attributes of the controller 240, associated modules, and processes are discussed below with greater detail with reference to FIGS. 10-13. The controller 240 can communicate with other system components via a network 246, such as a wireless network. The system 200 can be used to manage inventory items in the context of a workspace of an inventory facility, which can include a storage region 214 and/or a sorting floor 218. The workspace includes a physical workspace, in which the induct and replenishment stations 206, 224 are positioned, and on which unmanned drive units 20 operate in order to move and store inventory within the inventory facility. A virtual representation of the inventory facility can be maintained by the controller 240 in order to facilitate control over the drive units 20 moving therein.

The induct station 206 can operate in conjunction with an inbound conveyance 202, such as a chute, conveyer belt, series of shuttles, drive units 20 carrying inventory items 210 or inventory item holders thereon, or the like. The inbound conveyance 202 can pass through or otherwise include a sensor station 204 to facilitate physical data collection about inventory items. Aspects of sensor stations are discussed below with reference to FIG. 9. Further sensing elements 216 can be located directly adjacent or within the induct station 206. The inbound conveyance 202 is capable of transporting inbound inventory items for inductance into the inventory system, and can convey the items to the induct station 206 individually, on pallets, in bulk storage, in containers or the like. In some embodiments, the sensor station 204 and/or sensing elements 216 are configured to detect discrete physical attributes of the inventory items suitable for generating feature vectors. In some embodiments, one or both of the sensor station and sensing elements are capable of positively identifying an inventory item, e.g. by way of reading a machine-readable identifier on the inventory item.

Figure 8:
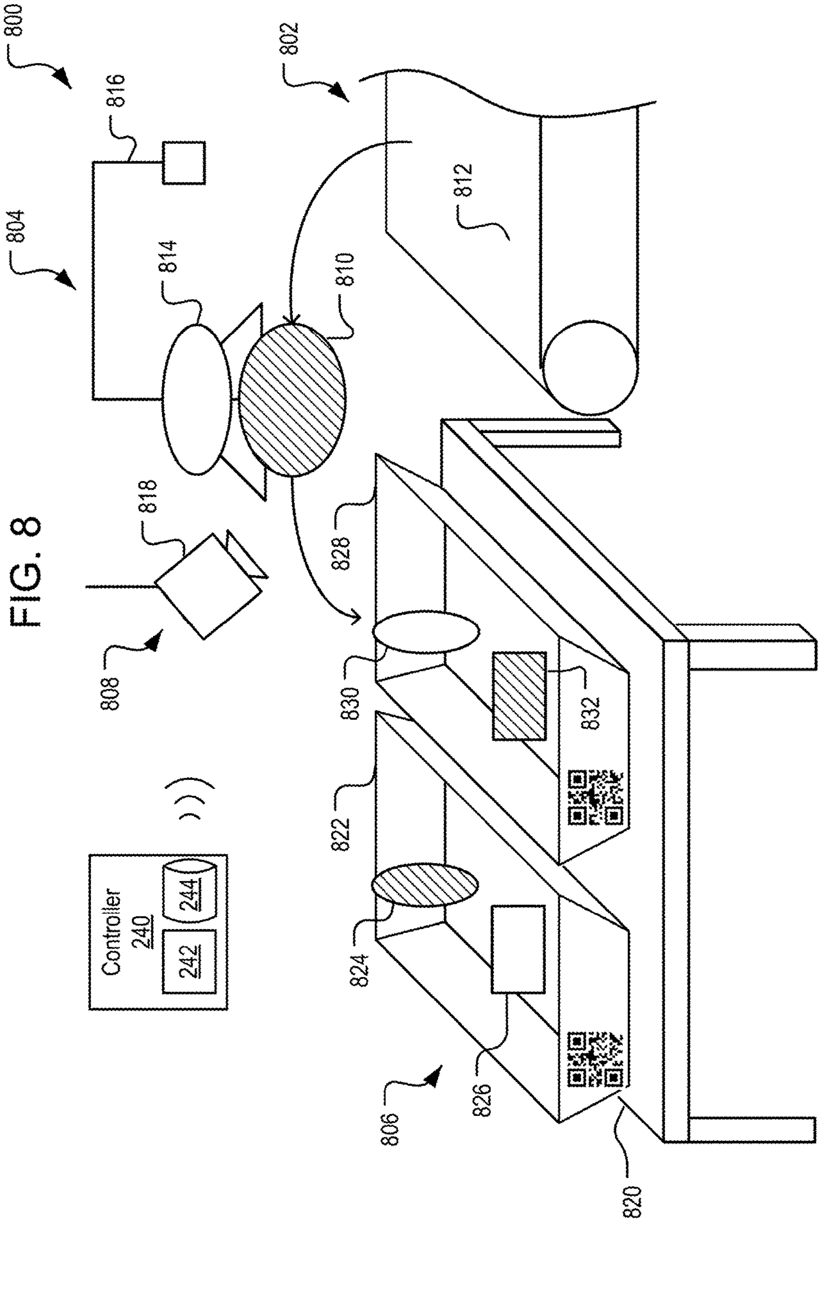
FIG. 8 shows a first example of a sorting station that can be used in the inventory system of FIG. 1.
Figure 9:
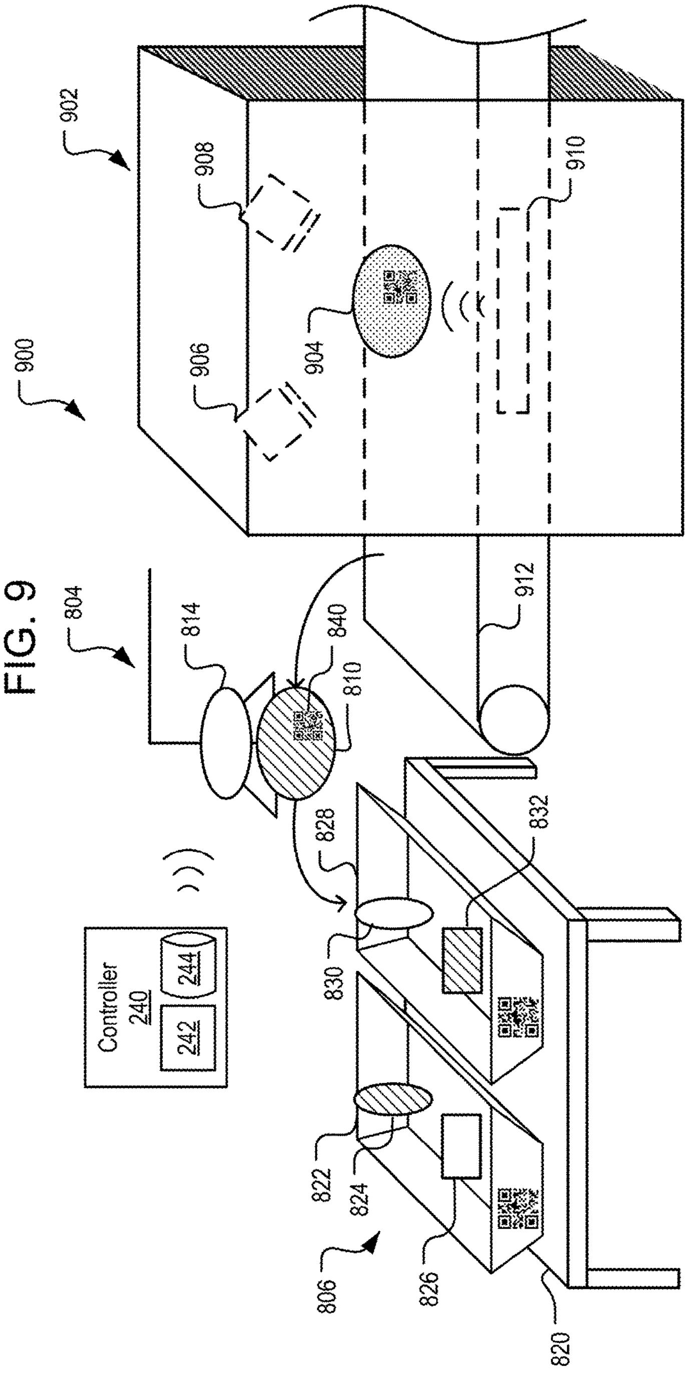
FIG. 9 shows a second example of a sorting station that can be used in the inventory system of FIG. 1.

Under the control of the controller 240, the induct station 206 can parcel out inventory items 210 into inventory containers 212 for transit to storage 214. In some embodiments, the inventory containers 212 are arrayed on inventory holders 208, e.g. into first inventory holders 212*a* positioned on a first inventory holder 208*a* adjacent the induct station 206. The inventory containers 212 that receive inventory items can be arrayed around or proximate to the induct station 206 for access by robotic manipulators of the induct station (FIGS. 8-9). In some embodiments, one or more inventory holders 208 containing inventory containers 212 are transported to loading positions adjacent the induct station 206 by a drive unit(s) 20. The inventory containers 212 can be transported to and from the induct station 206 by any suitable conveyance, e.g. via conveyor belts, shuttles, robotic gantries or grasping elements, or the like. The induct station 206 can be positioned and configured with robotic manipulators to access and place inventory items into any one of multiple inventory containers 212. In some embodiments, approximately ten inventory containers can be accessible at any one time, or in some cases, at least 2 inventory containers, e.g., 2-10, 2-20, or more than 20 inventory containers.

In some embodiments, the controller 240 causes the induct station 206 to load inventory items 210 into selected inventory containers 212 based on item attribute data 210, which can be in the form of a unique feature vector associated with the inventory item to be stored. For example, the item attribute data for each inventory item 210 can be accessed based on an identity of the inventory item, or may be generated based on sensed physical attributes as measured by the sensor station 204 or sensing elements 216. This item attribute data can then be compared with feature vectors associated with collections of items already present in each of the inventory containers 212*a* adjacent the induct station 206, in order to locate a destination container containing only items having feature vectors that are sufficiently distinct or machine differentiable as compared to the inventory item 210 to be stored. Specific aspects of feature vector distinctness are discussed below in greater detail with reference to FIGS. 10-13. Once all of the inventory containers 212*a* are full, or once a sufficient number of the inventory containers are full, the system controller 240 can direct a drive unit 20 to transfer inventory containers to storage 214 and to supply as-yet unfilled or partially unfilled inventory containers 212 to the induct station.

The system 200 can also replenish inventory in inventory containers 212 by way of replenishment stations 224 that are not necessarily inducting new inventory items. For example, ongoing sorting of inventory items can be conducted to optimize the contents of inventory containers by transferring inventory from existing containers to new containers according to methods described herein. In some embodiments, known inventory items 210 are transferred to storage from, e.g., other inventory systems (trans-shipped items) via conveyors 222, or from bulk containers 220 which may be transferred via inventory holders 208*c* and/or drive units 20. The replenishment station 224, which includes sensing elements 226, can select adjacent inventory containers 212*b* for storing inventory items 210 according to similar methods used to select destination containers as described above with reference to the induct station 206. In some embodiments, the replenishment station 224 scans the inventory items 210 via sensing elements 226 to determine a specific identifier of each inventory item in order to retrieve a known, item attribute data of the inventory item. In some embodiments, the system 200 generates an item attribute data of the inventory item based on sensed physical attributes of the inventory item. Once replenished, the inventory containers 212*b* can be returned to storage 214, e.g. by drive units 20.

The replenishment of inventory items 210 into inventory containers 212 can be accomplished when the inventory system is inducting new inventory, transferring in inventory, sorting inventory, or shipping inventory. For example, requested inventory items can be transported from storage 214 to a sorting floor 218, e.g. by drive units 20, where the selected inventory items are removed for sorting or shipping, resulting in a continuous stream of partially emptied inventory containers 212. These partially emptied inventory containers may be transported to replenishment stations 224 and/or to induct stations 206 where they can be refilled with additional inventory items. Partially emptied inventory containers can also be replenished while positioned on the sorting floor or even during a sorting operation when a select inventory item is removed. Specific aspects of selecting a destination container for receiving inventory items are discussed below with reference to FIGS. 8-13, whereas aspects of storage and transport of inventory are discussed below with reference to FIGS. 2-7.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Figure 2:
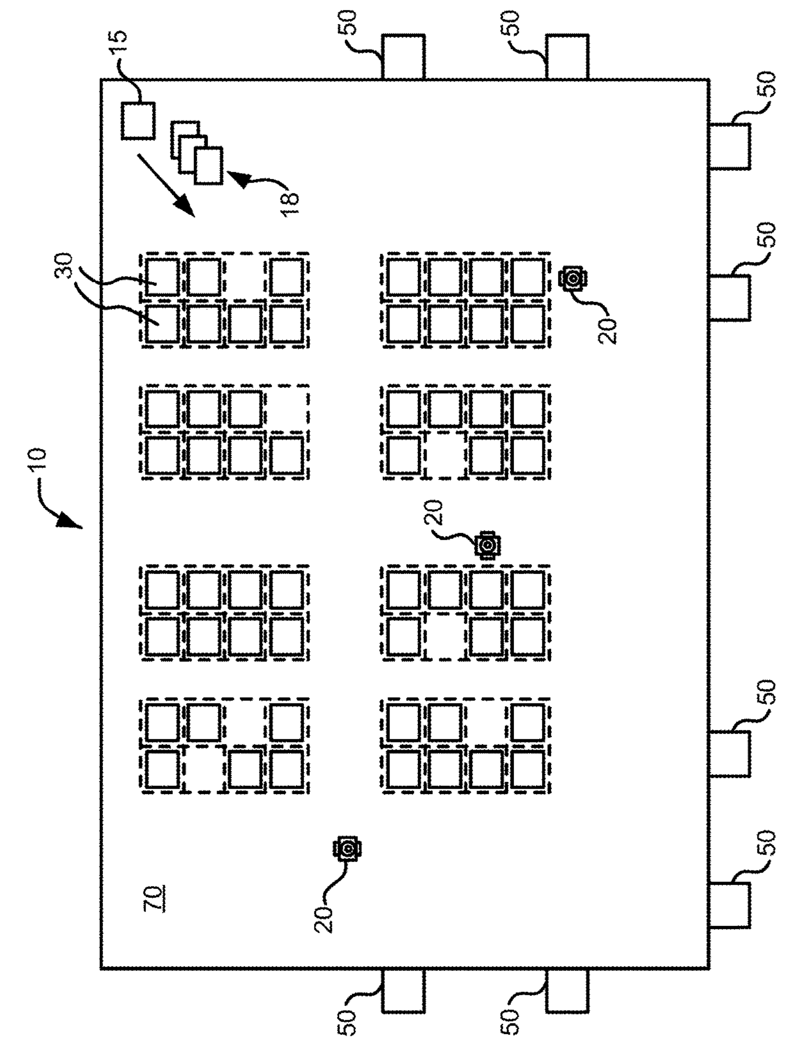
FIG. 2 illustrates components of the inventory system of FIG. 1.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
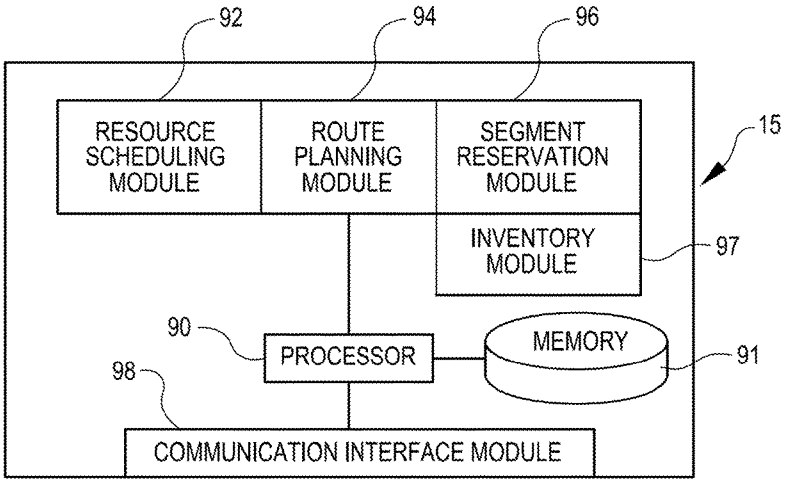
FIG. 3 illustrates in greater detail the components of an example management module that can be used in the inventory system of FIG. 1.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information used by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms using any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, using task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
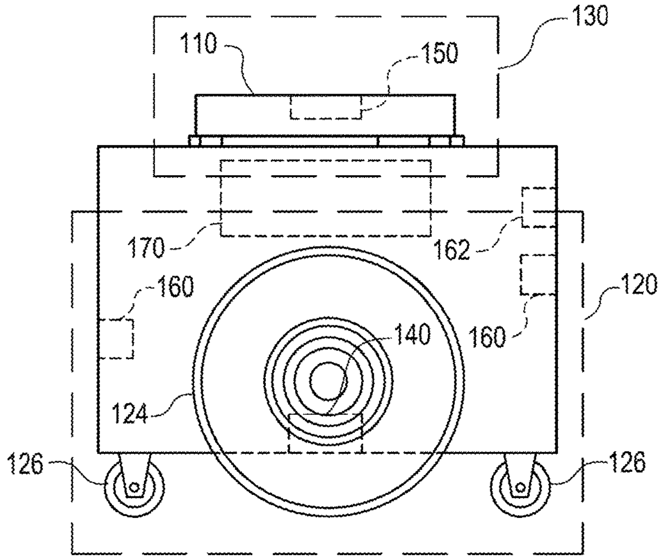
FIGS. 4 and 5 illustrate in greater detail an example mobile drive unit that can be used in the inventory system of FIG. 1.
Figure 5:
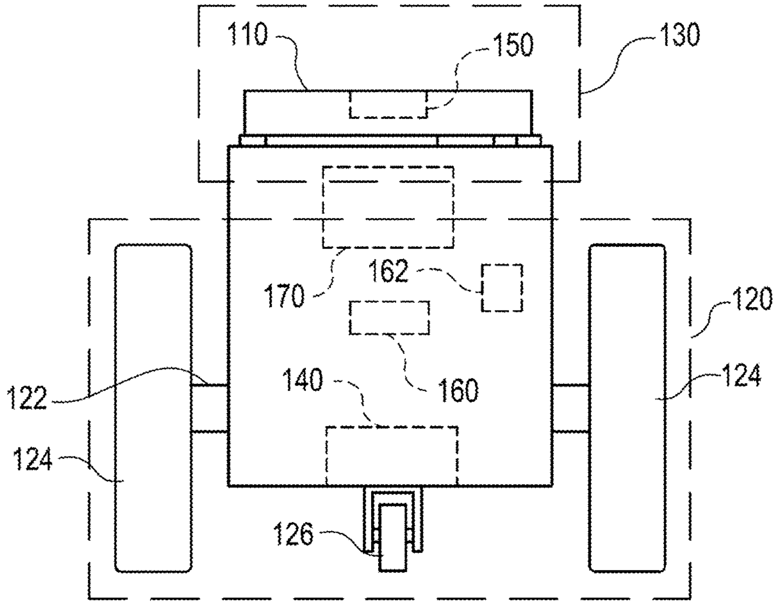

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device using appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
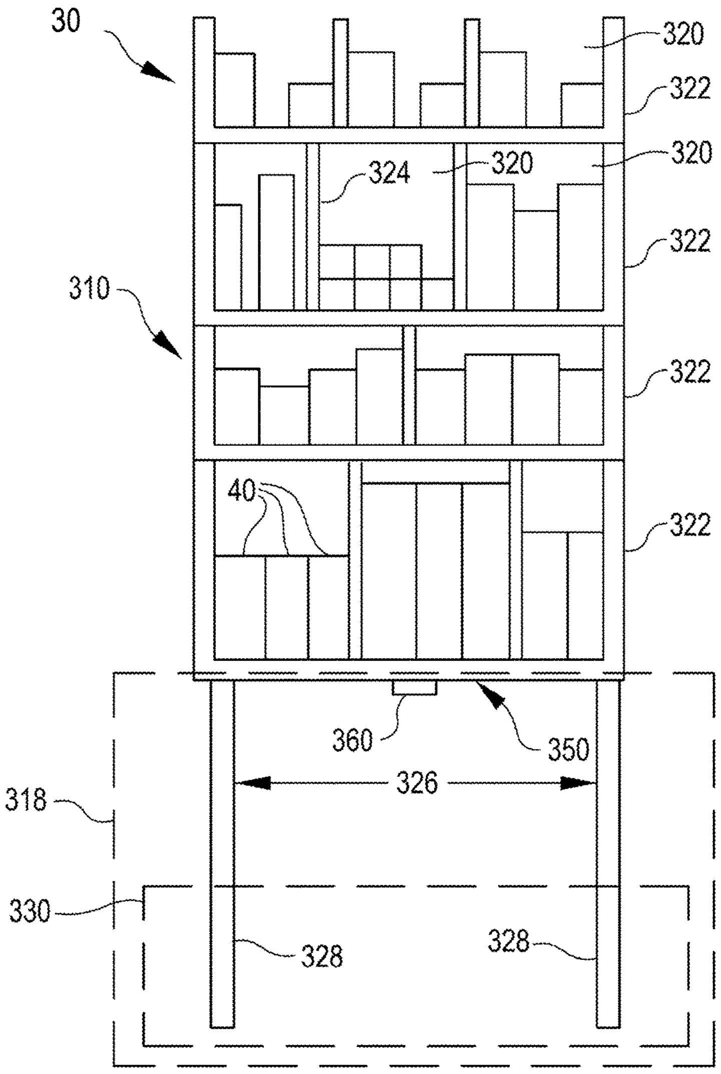
FIG. 6 illustrates in greater detail an example inventory holder that can be used in the inventory system of FIG. 1.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 used by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 7:
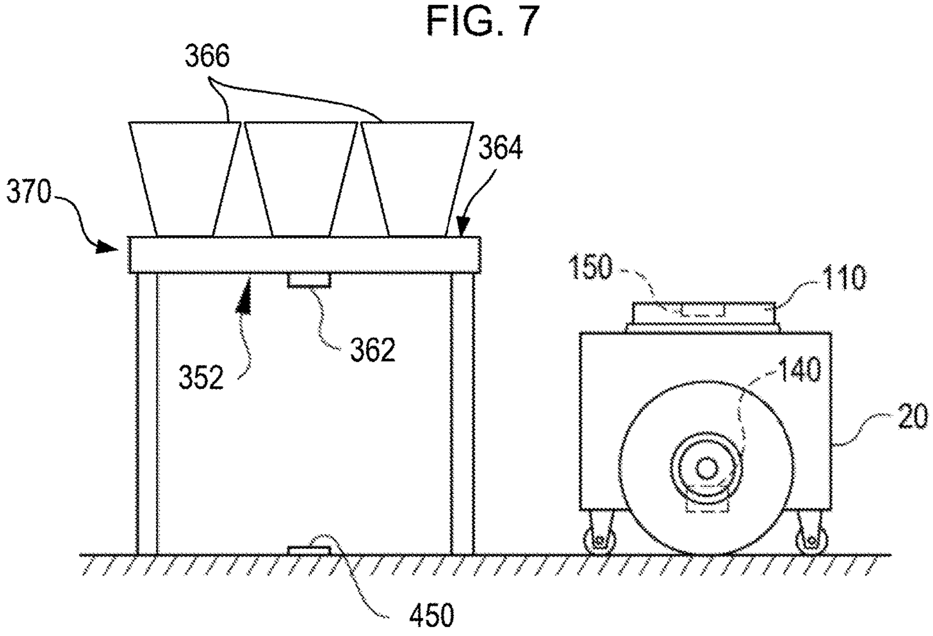
FIG. 7 shows various components of an alternative inventory holder that can be used in the inventory system of FIG. 1.

Systems and methods for transporting inventory via mobile drive units 20 as described above with respect to inventory holder 30 are applicable to various forms of inventory holders 30 discussed with reference to FIG. 2. For example, suitable inventory holders 30 can include any suitable container or stage for holding inventory, either directly or via intermediate containers. Suitable containers can include pallets, bulk containers, bins, or gaylords, platforms that may be adapted to hold one or more containers thereon, or other suitable holders. FIG. 7 shows various components of an alternative inventory holder 370 that may be used in particular embodiments of the inventory systems shown in FIGS. 1 and 2.

For example, FIG. 7 illustrates one example of an alternative inventory holder 370, which is adapted for use with a drive unit 20 and can carry inventory containers 366. The inventory holder 370 includes a stage 364 adapted to support the inventory containers 366. In one embodiment, the stage 364 is capable of supporting the inventory containers 366 in an array; but in various other embodiments, the stage can carry one or more alternative forms of inventory container as described above, or can carry individual inventory items thereon. The stage 364 can also include a docking surface 352 similar to docking surface 350 (FIG. 6) and a holder identifier 362 (similar to holder identifier 360, FIG. 6) to facilitate the alignment of the inventory holder 370 with drive unit 20.

FIG. 7 illustrates mobile drive unit 20 and inventory holder 370 prior to docking. As noted above with respect to FIGS. 1 and 2, mobile drive unit 20 may receive a command that identifies a location for a particular inventory holder 370. Mobile drive unit 20 may then move to the location specified in the command. Additionally, mobile drive unit 20 may utilize position sensor 140 to determine the location of mobile drive unit 20 to assist in navigating to the location of inventory holder 370.

In particular, FIG. 7 shows mobile drive unit 20 and inventory holder 370 as mobile drive unit 20 approaches the storage location identified by the received command. In the illustrated embodiment, the reference point is marked by fiducial mark 450, which includes a surface operable to reflect light and which, as a result, can be detected by particular embodiments of position sensor 140 when mobile drive unit 20 is positioned over or approximately over fiducial mark 450. As noted above, the illustrated embodiment of mobile drive unit 20 utilizes optical sensors, including a camera and appropriate image- and/or video processing components, to detect fiducial marks 450, holder identifier 362, or both. Once connected, the mobile drive units 20 can transport the inventory holder 370 to an induct station 206 or replenishment station 224, (FIG. 1) to storage 212, to a sorting floor 218, or other station in an inventory system.

FIG. 8 shows a first example of a sorting station 800 that may be used in particular embodiments of the inventory system shown in FIG. 1 in a side view. The sorting station 800 may be used, e.g., for inducting new items into an inventory system (e.g., induct station 206 as shown in FIG. 1) and/or for replenishing depleted inventory containers with inventory items already inducted (e.g., as in replenishment station 224, FIG. 1).

In an embodiment, the sorting station 800 includes a conveyance 802 (e.g. conveyor belt 812) for introducing items 810, a robotic manipulator 804 for transferring inventory items, a sensing element 808 for sensing attributes of the items, a controller 240 for controlling the operation of the sorting station, and a collection of destination containers 806 positioned on a stage or comparable inventory holder 820. Sorting station 800 represents a simplified example of a sorting station. Under the control of the controller 240, the inventory sorting station 800 can remove the inventory item 810 from the conveyance 802 via, e.g., a robotic grasper 814 of a manipulator 816, or other comparable robotic manipulator. The sensing element 808, which can include a camera 818, can scan the inventory item 810 before or after the item has been manipulated by the robotic manipulator 804.

In at least one embodiment, the sensing element 808 can detect an identifier associated with the inventory item 810, such as a machine-readable label or the like, from which the controller 240 can retrieve item information or item attribute data about the inventory item 810, including a feature vector. In alternative embodiments, the sensing elements 808 can also, or alternatively, scan the inventory item 810 to collect physical attribute data, from which the controller 240 can construct a feature vector. The scoring station 800 can then compare the feature vector of the inventory item 810 to be sorted with feature vectors of the stored inventory items 824, 826, 830, 832. Feature vectors of stored inventory items can be stored in conjunction with the inventory containers 822, 828 in which they are stored, thus allowing the controller 240 to readily access the feature vectors of each stored item based on the inventory containers. The feature vector of the inventory item 810 can be compared with the feature vectors of each stored inventory item 824, 826, 830, 832, in order to determine whether one of the potential destination containers 822, 828 has a collection of items sufficiently distinct from the inventory item 810. Once this determination is made, the inventory item 810 can be placed in the destination container containing the sufficiently distinct collection.

Although FIG. 8 shows sorting of inventory items from a conveyor 812 to storage containers, sorting station 800 can also transfer items from one storage container to another. For example, in an embodiment, the sorting station 800 can identify the item 810 from a container, e.g. by way of positive identification, and then proceed to transfer the item to a destination container based on the distinctness of the item's feature vector with respect to the feature vectors of items in the destination container. This selection may be aided by use of the feature vector of the inventory item 810. For example, in an embodiment, the sorting station 800 can identify, via the sensing element 808, one or more physical attributes of the inventory item 810. By accessing inventory data of a container containing the inventory item 810, the controller 240 can compare the identified physical attributes with the feature vectors of items stored with inventory item 810, in order to pick the inventory item. Positive identification may be used to verify that the correct inventory item was selected.

Alternative sorting stations may provide additional sensing elements for identifying an inventory item and/or for generating a feature vector, as described below with reference to FIG. 9. A more detailed discussion of feature vectors follows with reference to FIG. 10.

FIG. 9 shows a second example of a sorting station 900 that may be used in particular embodiments of the inventory system shown in FIG. 1. The sorting station 900 may be used, e.g., for inducting new items into an inventory system (e.g., induct station 206 as shown in FIG. 1) and/or for replenishing depleted inventory containers with inventory items already inducted (e.g., as in replenishment station 224, FIG. 1).

In an embodiment, the sorting station 900 includes a conveyer 912 for introducing items 810 that passes through a sensor station 902. In an embodiment, the sensor station 902 contains sensors 906, 908, 910 for collecting data corresponding to physical attributes of the inventory item 904 in the sensor station. In at least one embodiment, the sensor station 902 can include some or all of the features of a vision tunnel as described in U.S. Pat. No. 9,663,294, which is hereby incorporated by reference. The sensors 906-910 can include, e.g., any suitable subset of the following sensors: optical cameras, infrared cameras, infrared heat sensors and/or emitters, acoustic sensors and/or emitters, a weight scale, or other comparable sensor. The sensors 906-910 can include sensors positioned to capture images or data from inventory items at different angles (e.g., sensors 906, 908), or can be positioned to contact the inventory item or to support the inventory item through the conveyor 912 (e.g. sensor 910). The sorting station 900 can include all of the components of the sorting station 800 (FIG. 8), including a robotic manipulator 804 for transferring inventory items, a controller 240 for controlling the operation of the sorting station, and a collection of destination containers 806 positioned on a stage or comparable inventory holder 820, any or all of which may operate in the same manner as described above with reference to FIG. 8.

Some or all of the processes 1000, 1200, 1300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
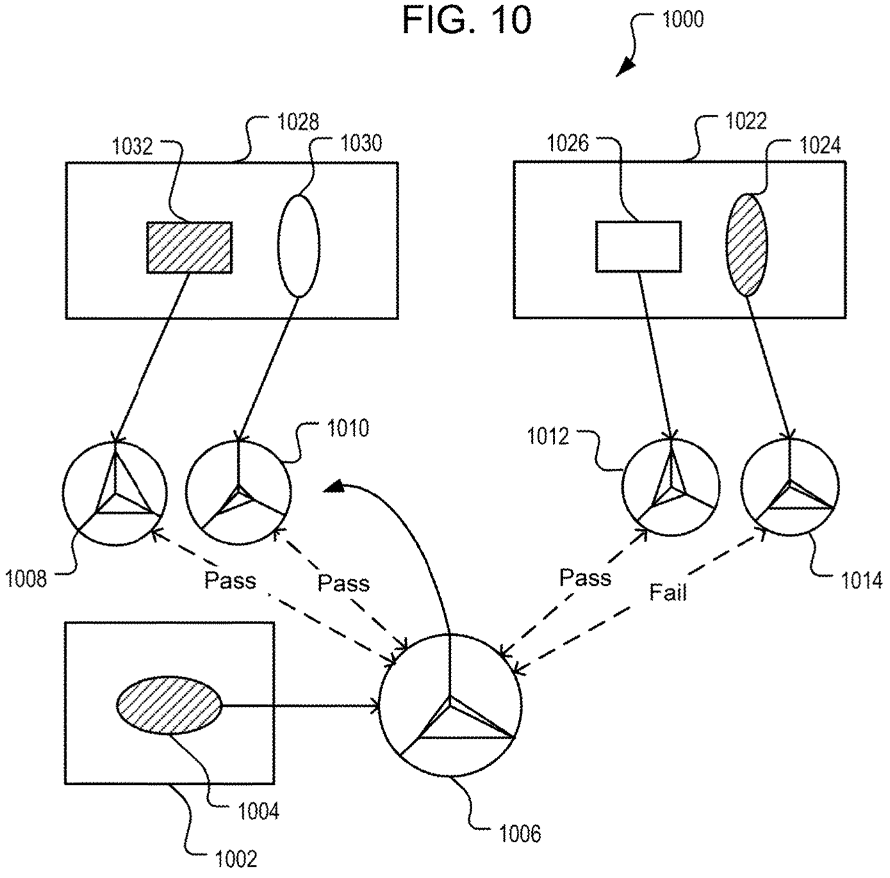
FIG. 10 is a simplified schematic diagram illustrating one example of a process for implementing feature vectors in container selection that can be used in the inventory system of FIG. 1.
Figure 11:
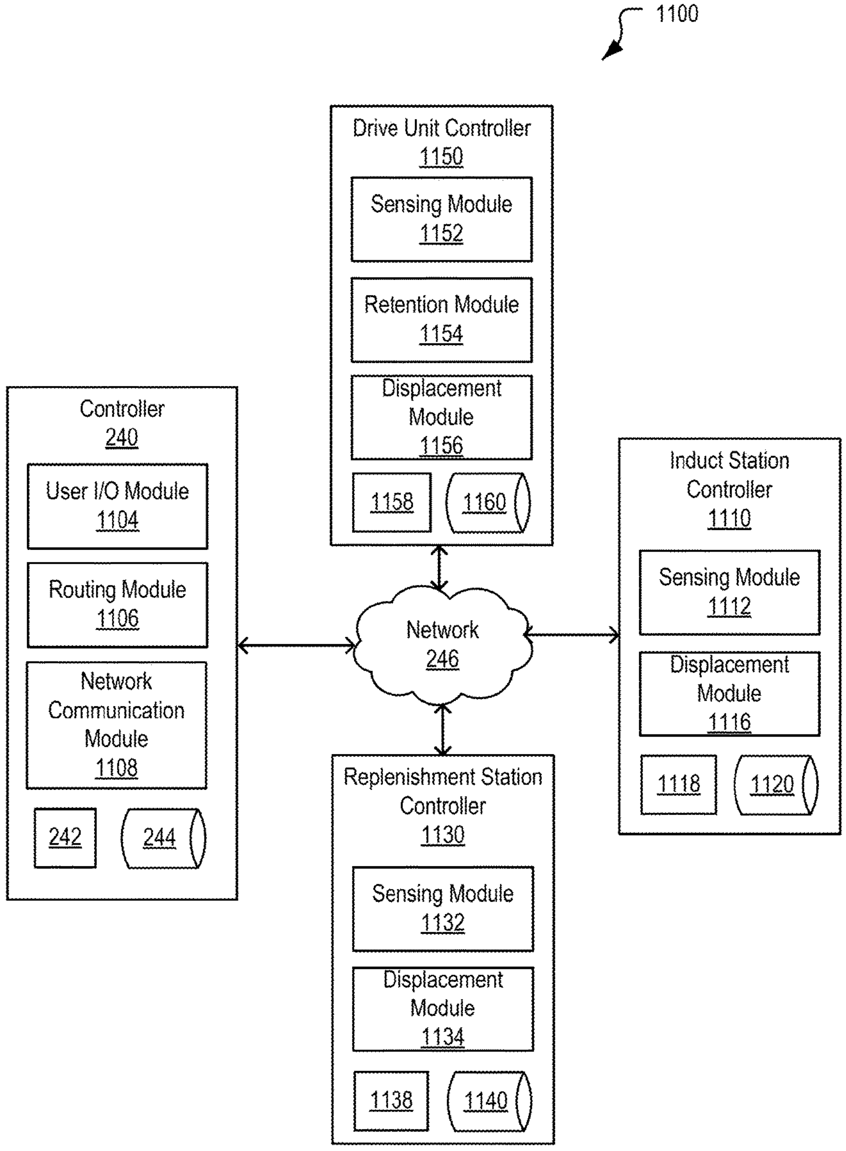
FIG. 11 is a simplified block diagram illustrating an example control system that can be used in the inventory system of FIG. 1

FIG. 10 is a simplified schematic diagram illustrating one example of a process 1000 for implementing feature vectors in container selection, in accordance with at least one embodiment. The process 1000 can be implemented in an inventory system such as inventory system 200 (FIG. 1), or by a system such as system 1100 (FIG. 11, below). FIG. 10 is presented as a simplified and non-limiting example of a process for generating unique feature vectors for inventory items based on a small number of physical attributes, which will typically be generated based on additional physical attributes.

In an embodiment, the process 1000 includes retrieving and/or generating feature vectors associated with select inventory items. For purposes of clarity, selected inventory item data 1024, 1026, 1030 and 1032 correspond, via like number, with representative inventory items 824, 826, 830, 832 as shown above with reference to FIGS. 8 and 9. Selections 1022 and 1028 corresponding to containers 822 and 828. Each instance of inventory data is associated with a respective feature vector, e.g., inventory data 1024 with feature vector 1008, inventory data 1030 with feature vector 1010, inventory data 1026 with feature vector 1012, and inventory data 1024 with feature vector 1014.

Feature vectors can be generated for each inventory item and stored in a data store in conjunction with data about that item, which may be indexed by any suitable form of item identifier. One method of generating feature vectors, as described above, is to scan the inventory item (e.g. at time of induct or during a sorting operation) to obtain data reflecting at least two distinct physical attributes. For purposes of this simplified example process 1000, two such physical attributes can include shape (presented here as a distinction between square and round item shape), and color (presented here as a distinction between shaded and unshaded). The feature vectors 1008-1014 roughly reflect these illustrative physical attributes in the Y-axis and X-axis, respectively (with “squareness” vertical, “shading” right), with a potential third vector aspect represented in the Z-direction.

Suitable feature vectors for actual use in sorting inventory items can encompass potentially many additional dimensions, including but not limited to: independent size attributes such as width, height, thickness, or mass; calculated size attributes such as volume or density; surface information including reflectivity or matte appearance; color information such as hue, saturation, vibrancy, color composition, or specific unique color content; tactile information such as weight, compressibility, or roughness; shape information identifiable from visual inspection, such as but not limited to parallel edges, amorphous edges, contour count, flaps; thermal properties such as heat dissipation or infrared spectrum; internal structure properties such as acoustic density; or text-based features such as identifiable textual content or text density, among other attributes. In embodiments, one or more physical attribute may be reduced to a representative numerical value, e.g. an intensity value, for generating an aspect of the feature vector; or multiple intensity values may be combined (e.g., averaged, multiplied, weighted average, etc.) to advantageously form feature vectors with more consistent properties. For example, in one embodiment, height, width, and thickness attributes may be reduced to intensity values (lengths) and multiplied to obtain a vector aspect corresponding to item volume, which is advantageous over any of the component values for its invariance with the item’s orientation in storage. In another embodiment, volume and mass intensity values may be combined by division to form a vector aspect corresponding to item density, which is similarly invariant. The physical attributes selected for a particular feature vector may also be selected to ensure the inclusion of adequately diverse attributes in the feature vector, e.g. density and color are likely to both be included because these attributes are typically independent of each other.

In the example process 1000, the feature vectors 1008-1014 correspond to a collection of intensity values associated with physical attributes, and are stored in conjunction with item data 1024-1032. These item data are each associated with one of the selections 1022, 1028. Item data 1004, corresponding to the item 810 (FIGS. 8-9), is selected for sorting 1002 into one of the selections 1022, 1028. The system can either retrieve or generate the unique feature vector 1006 for the inventory item 810 to be sorted. In an embodiment, the system can both retrieve a stored feature vector corresponding with an identifier of the item 810, and generate a new feature vector, in order to verify or update the feature vector. The unique feature vector 1006 can then be compared with each respective feature vector 1008-1014 of the collections of inventory items. As shown, the feature vector 1006 is distinct from each of the feature vectors 1008, 1010 of the first selection 1028, by virtue of the feature vector being markedly different in at least one vector aspect from each of the feature vectors 1008, 1010. The feature vector is not distinct from each of the feature vectors 1012, 1014 of the second selection 1022 by virtue of similarity to the feature vector 1014.

In one embodiment, distinctness can be determined by quantifying a difference between each respective feature vector aspect, and comparing each difference to a defined threshold value for that aspect. However, the specific threshold value for each vector aspect can differ based on the relative accuracy of sensing techniques to measure the corresponding physical attribute, the presence or absence of additional calculations to generate the feature vector from the corresponding physical attribute, and the relative value of a specific feature vector aspect in accurately distinguishing between different inventory items. In an embodiment, the threshold value for a feature vector aspect is determined empirically based on a confidence interval associated with the accuracy of selecting the intended item from a container of mixed items based on the select feature vector aspect.

Storing inventory items in containers based on these methods results in the storage of mixed items together that are readily distinguishable from one another by automated means according to physical attributes that are detectable via automated sensing. Preferably, these automated sensing means (e.g., weighing, image processing, etc.) can be conducted without necessitating manipulation of the item, or with only a partial view of the item. Thus, pre-sorting items according to the described methods can reduce or eliminate the need for mechanical manipulation of inventory items in storage during later retrieval, greatly reducing sort times.

FIG. 11 is a simplified block diagram illustrating an example system 1100 for controlling an inventory system like the system 200 of FIG. 1, in accordance with embodiments. The system 1800 may be operable to control any suitable number of drive units 20 for transporting inventory holders 208 (FIG. 1) or 30 (FIG. 2), to control any suitable number of sorting stations, e.g. at item induct stations 206 and/or replenishment stations 224, as well as other system elements.

For example, the system 1100 includes a controller 240, similar to controller 240 as described with reference to FIG. 1, including a processing module 242 and memory 244 operable to maintain any or all of, or any suitable combination of the following modules: a user I/O module 1104, a routing module 1106, and a network communication module 1108. Any or all of said modules may be configured to enable automated or semiautonomous actions by the drive units 20 and/or item induct and replenishment stations 206, 224 described above. The system 1100 can also include individual control modules for each aspect of the system, such as a drive unit controller 1150, replenishment station controller 1130, and induct station controller 1110 for controlling operation of the induct station.

The controller 240 can include a computer system configured to receive instructions via a network 246 and cause drive units, modular sorting stations, and other robotic elements to act in accordance with those instructions. For example, the user I/O module can receive user input and generate outputs from received data, e.g., the I/O module can include a switch, keyboard, screen, touchscreen, microphone, or any other suitable device for entering a user input or for displaying a visual or audible output. User input can include, e.g., instructions from a user to store or retrieve inventory items. Data can also include a status message, such as any suitable error message or status update. The routing module 1106 can direct pathfinding for drive units, can instruct drive units to retrieve or transport particular inventory holders from site to site within an inventory system, and can direct routing of select inventory items out of the inventory system or into storage. A network communication module 1108 can facilitate communication of instructions from the controller 240 to the various other components via the network 246, as well as the transfer of data from the various components back to the controller 240.

The drive unit controller 1150 can include at least the following components and subsystems. A sensing module 1152 can detect the local position of each drive unit, e.g. by way of fiducial markings with respect to a workstation floor, with respect to select workstations such as the induct station 206 (FIG. 1) or replenishment station 224 (FIG. 1), or at other stations or locations in an inventory system including in a storage region of the workstation floor or in a sorting or outbound processing region of a workstation floor. A retention module 1150 can cause drive unit to engage or disengage from an inventory holder in order to lift, transport, and deposit inventory holders in the inventory system. A displacement module can respond to routing instructions form the routing module 1106 by causing the drive unit to move within the inventory system according to the routing instructions. In one embodiment, the drive unit controller can cause the drive unit to displace based on routing instructions from the controller 240, e.g. by calculating specific routes using onboard processing 1158 and memory 1160. In alternative embodiments, each drive unit can be directly controlled by the controller via the network 246.

The induct station controller 1110 can include a sensing module 1112 for controlling sensors associated with the induct station 206 and a displacement module 1116 for controlling any robotic manipulators associated with the induct station. The modules of the induct station controller 1110 may be implemented via one or more onboard controllers at the induct station possessing local processing 1118 and memory 1120, or may be implemented by the controller 240 via the network 246.

In an embodiment, the sensing module 1112 can control one or more sensors associated with the induct station 206 (FIG. 1) to collect physical attribute data about an inventory item being inducted into the inventory system, as discussed above. The sensing module 1112 can operate multiple types of sensors simultaneously, e.g., optical sensors operating in any suitable visible or sub-visible wavelength, optical or electromagnetic readers, acoustic sensors, tactile sensors, or the like. In some cases, the sensors may be positioned to scan an inventory item while it is conveyed through a controlled environment, such as a vision tunnel as described in U.S. Pat. No. 9,663,294, which is incorporated by reference. The sensing module 1112 may be further configured to utilize image based identification techniques as discussed in U.S. Pat. No. 9,665,960, or attribute identification techniques as described in U.S. Pat. No. 9,569,700, (both hereby incorporated by reference,) to associate specific attributes with an inventory item when the inventory item is scanned. In one embodiment, the sensing module 1112 can also collect the various physical attribute data of the inventory item in order to generate a feature vector based on the data.

The displacement module 1116 can control mechanical systems of the induct station to transfer inventory items into the inventory system, e.g. by controlling actuation of a robotic manipulator, such as a robotic grasper, gantry robot, conveyor, or the like, to transfer inventory items into or out of containers. In some cases, the displacement module 1116 can work in concert with the sensing module 1112, with the sensing module providing location data for target inventory items. In some cases, the displacement module 1116 may also move inventory items in order to improve item visibility to sensors associated with the sensing module 1112.

Similarly, the replenishment station controller 1130 can include a comparable sensing module 1132 and displacement module 1134 that can act to collect data on inventory items and to transfer inventory items into, out of, or between storage containers. The modules of the replenishment station controller 1130 may be implemented via one or more onboard controllers at the induct station possessing local processing 1138 and memory 1140, or may be implemented by the controller 240 via the network 246.

In an embodiment, the sensing module 1132 of the replenishment station controller 1130 can perform similar operations using similar sensors to those described above with respect to the induct station controller 1110. Likewise, the displacement module 1134 of the replenishment station controller 1130 can perform similar operations to those described with respect to the induct station controller 1110. Although each station may be capable of performing the same functions with the same equipment, the stations may typically be assigned different tasks. For example, in one embodiment, the induct station controller 1110 may perform more detailed scans of inducted items than those required at the replenishment station. In some cases, the replenishment station may receive containers containing known inventory items with established inventory data, in which case, the sensing module 1132 of the replenishment station 1130 may confirm the identity of an inventory item and its associated feature vector based on contextual information such as an identified container in which replenishment items are provided.

Figure 12:
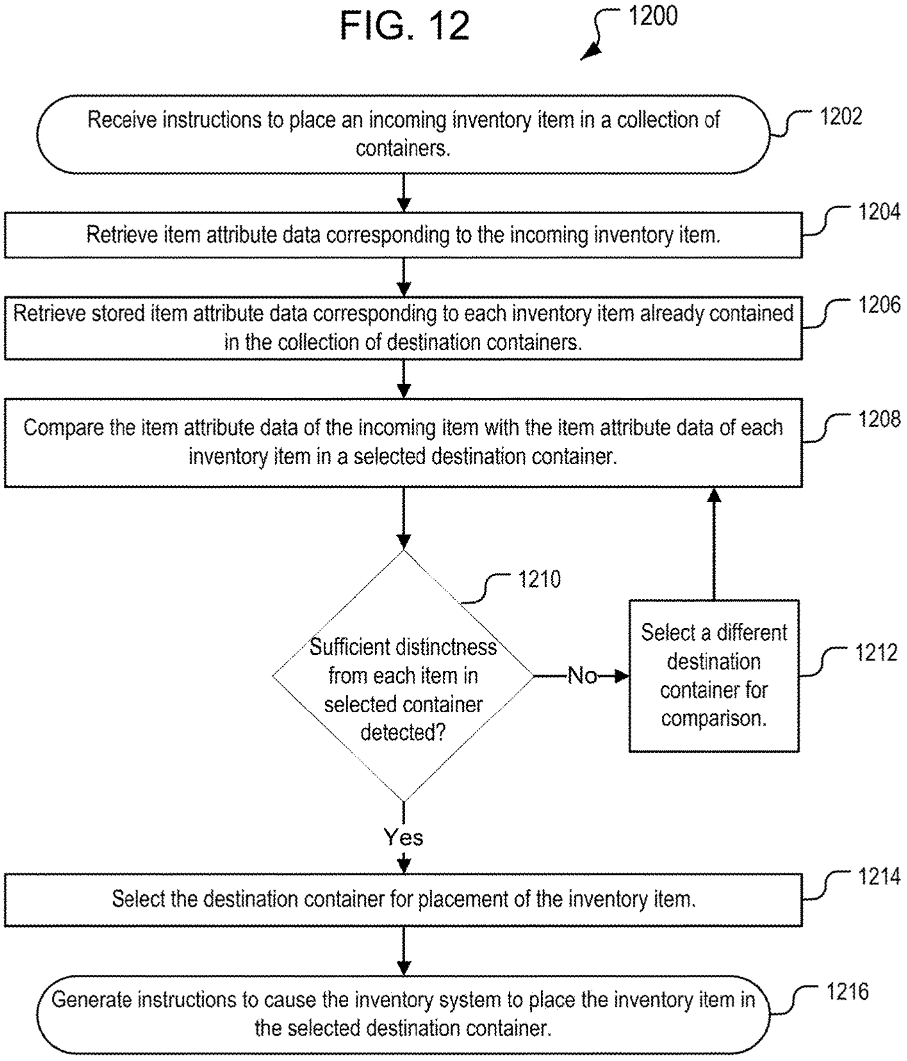
FIG. 12 illustrates a first example process for implementing container selection using feature vectors that can be used in the inventory system of FIG. 1.
Figure 13:
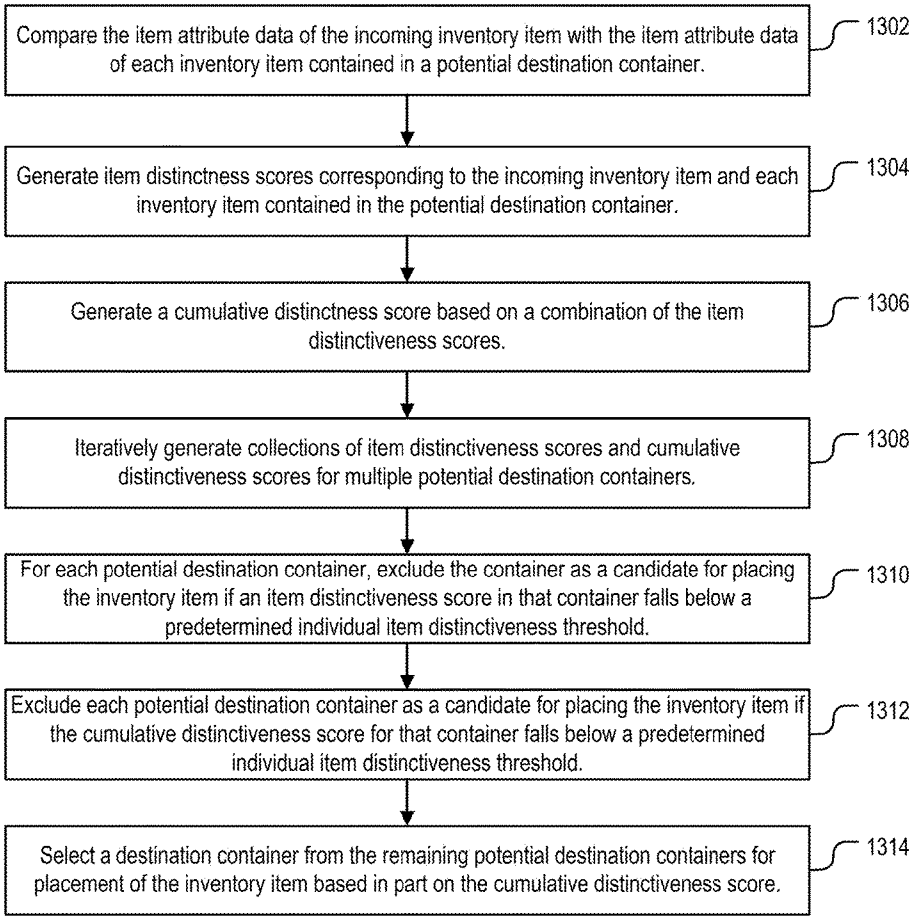
FIG. 13 illustrates a second example process for implementing container selection using feature vectors that can be used in the inventory system of FIG. 1.

Techniques described herein include methods of selecting a destination container for placing inventory items in an inventory system. For example, FIGS. 12 and 13 illustrate example processes 1200 and 1300 for implementing container selection using feature vectors. Aspects of the processes 1200, 1300 may be performed, in some embodiments, by a similar system to the systems 200 or 1100 discussed with reference to FIGS. 1 and 11.

FIG. 12 illustrates a first example process 1200 for implementing container selection using item attribute data, e.g. feature vectors. In an embodiment, the process 1200 includes receiving instructions to place an inventory item (act 1202). In some cases, the instruction may specify a range of available containers, or the system may provide a continuous throughput of potential destination containers which can be assessed for suitability for placing the inventory item. In some cases, approximately ten available containers may be available for placement of any one inventory item, though certain systems may provide as few as two containers, or many containers, e.g. up to 20, up to 30, or up to 40 containers, or more.

Next, the system can retrieve a unique feature vector of the inventory item to be placed (act 1204). In some embodiments, retrieving the item attribute data can include generating a unique feature vector of the inventory item as discussed above with reference to FIG. 10, e.g. by retrieving inventory data based on sensed information, and converting the inventory data into a feature vector. The system can also retrieve stored feature vectors of the inventory items already contained by the inventory containers serving as potential destination containers for the inventory item.

The system can then perform a set of comparisons in order to determine the correct inventory container in which to deposit the inventory item. First, the system compares the item attribute data for the particular inventory item to be placed with corresponding item attribute data for inventory items in at least one of the potential destination containers (act 1208). The system may perform this comparison step on each contained item of one destination container at a time, or may perform the comparison step on all stored items in the potential destination containers. The comparison step determines whether detectable distinctness, i.e. distinctness with a confidence greater than a particular predetermined threshold, exists between the inventory item to be placed and all of the items in the selected container (act 1210). If there is insufficient distinctness, e.g. if at least one item in the container is too similar to the inventory item to be placed, the system can select a different destination container for comparison (act 1212). In some alternative embodiments, the system may also recruit an empty container or a container with known distinctness with respect to the inventory item, which may be from outside the set of partially filled potential destination containers.

When the system has identified a destination container with a selection of items that are sufficiently distinct from the inventory item to be placed (act 1210), the system can select the identified destination container for placement of the inventory item 1214. Once selected, the system may also cause mechanical systems, such as a robotic displacement mechanism, to physically transfer the inventory item into the specified container (act 1216), and may also signal to the inventory system to transfer the specified container (e.g., if filled), for storage, transport, or further sorting via one or more drive units, conveyances, or other suitable mechanism.

While the process 1200 described above provides for one aspect of selecting a container for placement of an inventory item, more sophisticated selection methods may be employed in conjunction with, or replacing, those described above. For example, the process 1200 includes selecting the container based on a pass condition, in which the comparison step does not exclude any individual item contained in the container as having too small an item distinctness value. This pass condition may be included with other conditions for selecting an inventory container. For example, FIG. 13 illustrates a second process 1300 for implementing container selection using item attribute data, aspects of which may be used in conjunction with, or instead of, those in process 1200.

In an embodiment, the process 1300 includes comparing the item attribute data of the item to be placed with the feature vector of each inventory item in a potential destination container (act 1302). Based on the comparison step, an item distinctness score or value is determined for each of the stored inventory items of the potential destination container with respect to the inventory item to be valued (act 1304). These distinctness values can be combined, e.g. averaged, summed, subjected to a weighted average, or otherwise combined to generate a cumulative distinctness value for the potential destination container reflective of the relative ease of detectability of the inventory item to be stored with reference to the items already present in the potential destination container (act 1306). The process steps for generating cumulative distinctness values for a potential destination container may be repeated for any suitable number of potential destination containers. Additional destination containers may be analyzed until a predetermined number of destination containers have been assessed, e.g. all available containers, or a subset of the available containers. In some embodiments, additional containers may be analyzed until a cumulative distinctness value is generated that is above a predetermined threshold, or other suitable criteria.

Next, the system can also compare the item distinctness values of the individual items for item distinctness values below a threshold, the threshold being indicative of items that are more similar, i.e. less detectably distinct from the inventory item to be stored (act 1310). The potential destination containers containing these items, which may be potentially problematic, can then be excluded as candidates for storing the inventory item, thus preventing similar inventory items from being stored together in the same container. The system can also compare the cumulative distinctness values of the potential destination containers against a cumulative distinctiveness threshold, and exclude those destination containers which do not meet a minimum distinctness value (act 1312). The system can then select a destination container for placement of the inventory item based in part on the cumulative distinctiveness values of the remaining destination containers, e.g., by selecting the destination container with the highest cumulative distinctiveness (act 1314). However, in some alternative embodiments, other criteria may be employed in addition to, or instead of, the cumulative distinctness of the container. For example, in some cases a selection of the potential destination containers may pass any one of the above-referenced exclusion criteria, and may be selected from among passing destination containers based on other attributes such as: the number of items already contained in a destination container (e.g., prioritizing filled containers in order to cycle additional containers back to storage, or prioritizing containers with fewer items). In some embodiments, a container may also selected based on container-specific criteria, such as, the expected frequency of access of a container (e.g., placing frequently-accessed items together), the remaining volume in a container (e.g., placing large items in emptier containers), the remaining weight capacity of a container (e.g., placing heavy items with light items), and the like.

Figure 14:
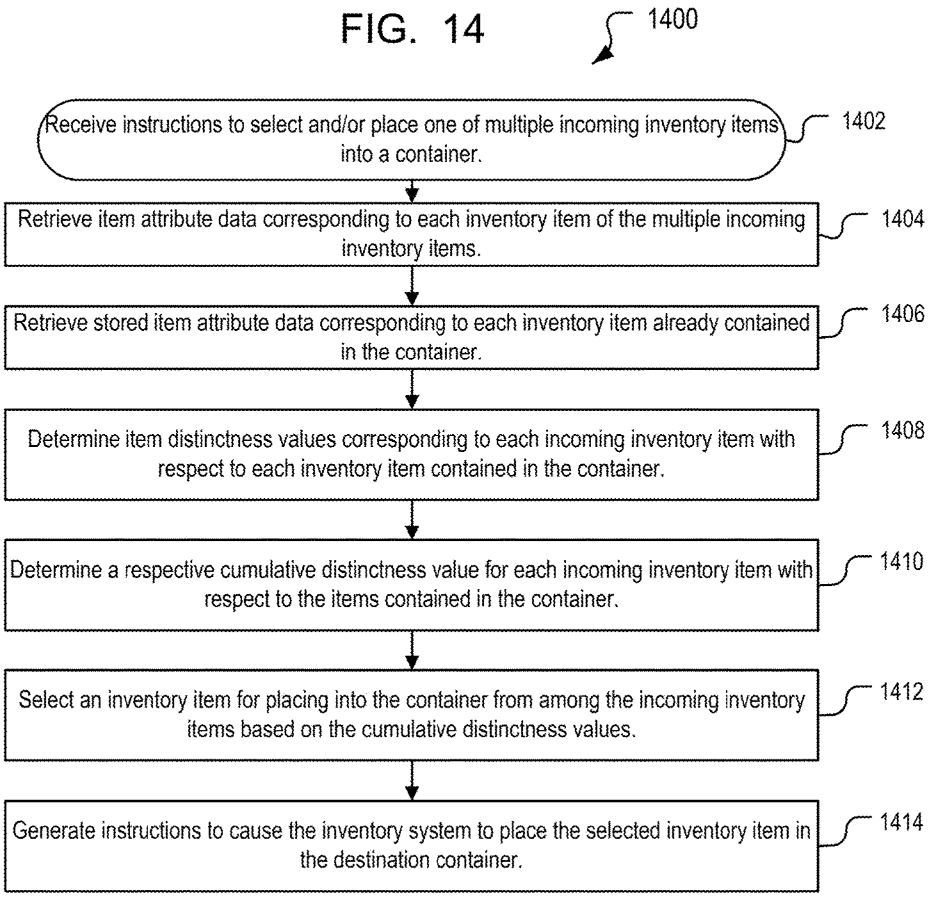
FIG. 14 illustrates a third example process for implementing container selection using feature vectors that can be used in the inventory system of FIG. 1.
Figure 15:
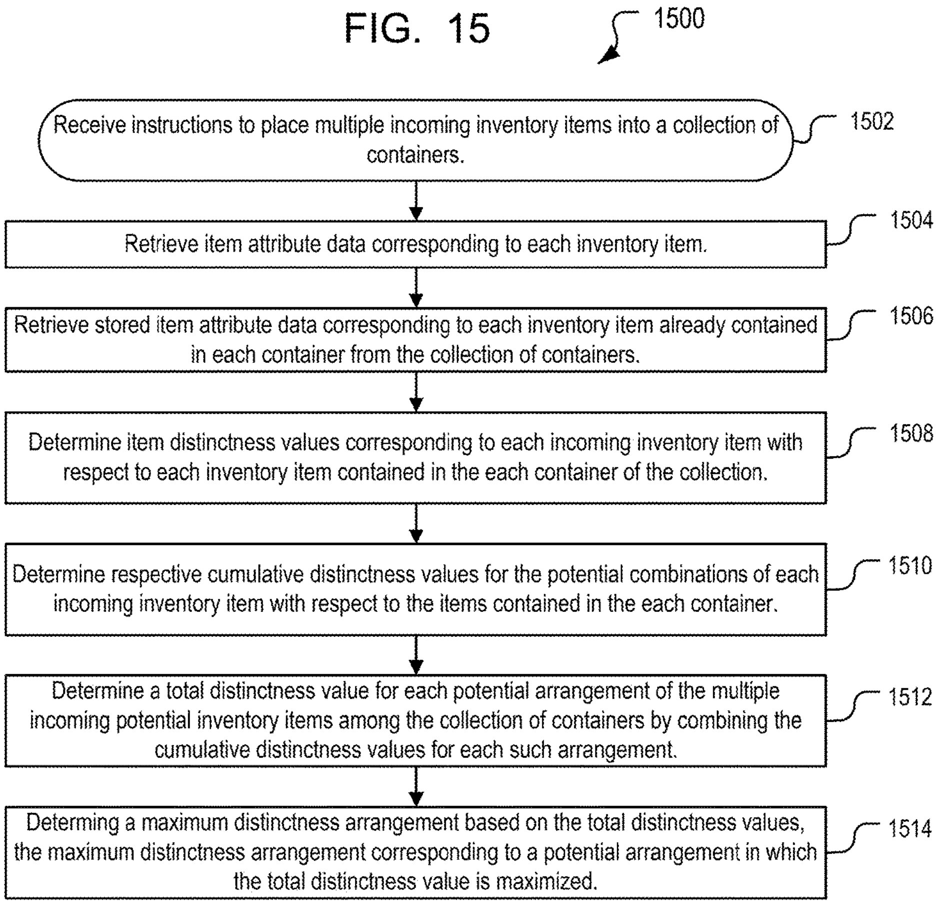
FIG. 15 illustrates a fourth example process for implementing container selection using feature vectors that can be used in the inventory system of FIG. 1.

While the processes 1200 and 1300 described above provide for methods of sorting one incoming item into a container from a selection of containers, process variants can also take into account multiple incoming items when selecting a container (i.e. a “many to one” case), or can select multiple destination containers from among multiple items (i.e. a “many to many” case). These methods can be used in concert or combination with the above-referenced methods. For example, by using exclusion criteria for individual items as described with reference to FIG. 12 or 13. For example, FIG. 14 illustrates a third process 1400 for implementing container selection using feature vectors that considers multiple inventory items to select a single destination container; and FIG. 15 illustrates a fourth process 1500 for implementing container selection that considers the allocation of multiple inventory items among multiple potential destination containers.

In an embodiment, the process 1400 includes comparing item attribute data, e.g. feature vectors, of multiple incoming inventory items with stored inventory items in a potential destination container. First, the system receives instructions to place multiple inventory items into one or more containers of a selection of containers (act 1402). The system can retrieve item attribute data corresponding to each of the incoming inventory items (act 1404) as well as stored item attribute data corresponding to each inventory item already contained in a container (act 1406). Once the data has been retrieved, the system can determine item distinctness values for each item in a container with respect to each incoming item (act 1408). The distinctness values corresponding to the items can be combined to generate cumulative distinctness values for each incoming inventory item with respect to the container (act 1410). An inventory item can then be selected from among the multiple incoming inventory items for placing into the container (act 1412). In some embodiments, the system can generate instructions to cause the physical placement of the selected inventory item in the container (act 1414), e.g. via a robotic manipulator.

In various embodiments, the process 1400 can continue iteratively by adding new items whenever an item is placed; and by advancing selection to a new container when a given container has been filled. In some cases, all of the items may be unsuitable for placement into the selected container, in which case the system may advance to the next container, and/or may add new items for comparison. In some embodiments, multiple containers may be assessed simultaneously, as described below with reference to FIG. 15.

In an embodiment, the process 1500 includes comparing attribute data multiple incoming inventory items, simultaneously, with attribute data from items contained among multiple potential destination containers. First, the system receives instructions to allocate multiple inventory items among the containers of a collection of containers (act 1502). The system can retrieve item attribute data corresponding to each of the incoming inventory items (act 1504) as well as stored item attribute data corresponding to each inventory item already contained in each container of the collection (act 1506). Once the data has been retrieved, the system can determine item distinctness values for each item among all contained items with respect to each incoming item (act 1508). The distinctness values can be combined to generate cumulative distinctness values for each incoming inventory item with respect to each of the containers of the collection (act 1510). The system can then iteratively determine a total distinctness value, based on the cumulative distinctness values, for each potential arrangement of incoming inventory items among the available containers (act 1512), and can maximize the item uniqueness for each placement by selecting the arrangement that maximizes the distinctness value (act 1514). In various embodiments, the process 1500 can be combined with individual item assessments as described above with reference to FIGS. 12-14. For example, potential arrangements can be ignored or removed as candidates if one or more placements in the potential arrangement would violate one or more exclusion as described in FIG. 14.

Figure 16:
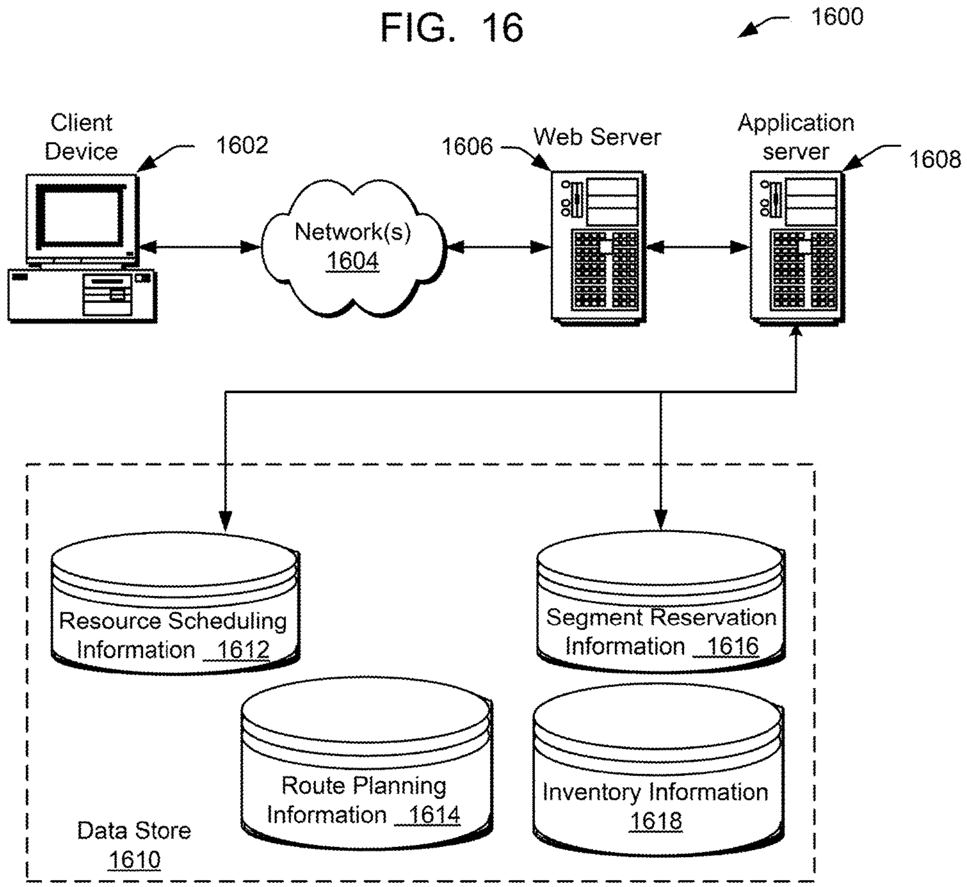
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing information which can be used by modules described herein, such as resource scheduling information 1612, route planning information 1614, segment reservation information 1616, and/or inventory information 1618. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment using several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments using a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:

one or more sensors configured to sense at least one physical attribute of an incoming inventory item;

a first destination container containing a first selection of inventory items;

at least one processor; and at least one tangible memory device storing non-transitory instructions executable by the at least one processor to cause the at least one processor to:

obtain incoming item attribute data for the incoming inventory item, via the one or more sensors, indicative of the at least one physical attribute of the incoming inventory item;

retrieve first destination container attribute data indicative of the at least one physical attribute for each inventory item of the first selection of inventory items contained in the first destination container; and assess, based on the incoming item attribute data and the first destination container attribute data, whether the incoming inventory item is detectably distinguishable with respect to the first selection of inventory items to enable automated selection of the incoming inventory item from among the first selection of inventory items in the first destination container if the incoming inventory item is stored together with the first selection of inventory items.

2. The system of claim 1, further comprising a second destination container, wherein the executable instructions are further configured to cause the at least one processor to:

retrieve second destination container attribute data indicative of the at least one physical attribute for each of inventory items contained in the second destination container;

generate first cumulative distinctness values for the first destination container based on assessing relative uniqueness of the incoming item attribute data with respect to the first destination container attribute container data;

generate second cumulative distinctness values for the second destination container based on assessing relative uniqueness of the incoming item attribute data with respect to the second destination container attribute container data; and select the first destination container for placement of the incoming inventory item in response to the first cumulative distinctness value being greater than the second cumulative distinctness value.

3. The system of claim 1, further comprising a second destination container, wherein the executable constructions are further configured to cause the at least one processor to:

retrieve second destination container attribute data indicative of the at least one physical attribute for each of inventory items contained in the second destination container;

assess whether the incoming item attribute data is sufficiently distinguishable relative to the second destination container attribute data to enable automated selection of the incoming inventory item from the second destination container based on the incoming item attribute data if the incoming inventory item is contained in the second destination container; and in response to determining that (a) the incoming attribute data is sufficiently distinguishable relative to the first destination container data to enable the automated selection of the incoming item from the first destination container, (b) the incoming attribute data is sufficiently distinguishable relative to the second destination container data to enable the automated selection of the incoming item from the second destination container, and (c) the first container contains more items than the second container; select the first destination container for placement of the incoming inventory item.

4. The system of claim 1, further comprising a robotic manipulator operable to transfer the inventory item into the first destination container; and wherein the executable constructions are further configured to cause the at least one processor to:

select the first destination container for placement of the incoming inventory in response to the incoming item attribute data being sufficiently distinguishable relative to the first container destination data to enable the automated selection of the incoming item from the first destination container; and cause the robotic manipulator to transfer the inventory item into the first destination container in response to the selection of the first container for placement of the inventory item.

5. The inventory system of claim 1, wherein the first selection of inventory items in the first destination container comprise one or more inventory items that are detectably distinguishable from each other.

6. The inventory system of claim 1, wherein the instructions are further configured to cause the at least one processor to assess whether the incoming inventory item is detectably distinguishable with respect to the first selection of inventory items by:

determining a distinctness value for a combination of the incoming inventory item and the first selection of inventory items; and comparing the distinctness value to a threshold.

7. A method of placing inventory, the method comprising:

accessing a data store to retrieve item attribute data for an incoming inventory item, the item attribute data indicative of at least one physical attribute of the incoming inventory item;

accessing attribute data indicative of the at least one physical attribute for each inventory item stored in a first destination container;

accessing attribute data indicative of the at least one physical attribute for each inventory item stored in a second destination container;

comparing the item attribute data for the incoming inventory item to the attribute data for the inventory items stored in the first destination container;

comparing the item attribute data for the incoming inventory item to the attribute data for the inventory items stored in the second destination container; and selecting the first destination container for placement of the inventory item by determining, based in part on the item attribute data for the incoming inventory item and the attribute data for the inventory items stored in the first and second destination containers, that the incoming inventory item is detectably distinguishable with respect to the inventory items stored in the first destination container to enable automated selection of the incoming inventory item from among the inventory items stored in the first destination container.

8. The method of claim 7, further comprising:

generating instructions to cause a robotic manipulator to deposit the incoming inventory item in the first destination container in response to selecting the first destination container for placement of the incoming inventory item.

9. The method of claim 7, further comprising:

determining first destination container distinctness values for the incoming inventory item, each of the first destination container distinctiveness values being indicative of the distinctness of the incoming inventory items relative to a respective one of the inventory items stored in the first destination container;

determining a first cumulative distinctness value for the incoming inventory item relative to the inventory items stored in the first destination container based on the first destination container distinctness values;

determining second destination container distinctness values for the incoming inventory item, each of the second destination container distinctiveness values being indicative of the distinctness of the incoming inventory items relative to a respective one of the inventory items stored in the second destination container;

determining a second cumulative distinctness value for the incoming inventory item relative to the inventory items stored in the second destination container based on the second destination container distinctness values;

comparing the first cumulative distinctness value to the second cumulative distinctness value; and selecting the first destination container for placement of the incoming inventory item in response to the first cumulative distinctness value being greater than the second cumulative distinctness value.

10. The method of claim 7, further comprising:

generating a cumulative distinctness value for the first set of contained inventory attribute data based on the comparing;

determining that the cumulative distinctness value of the first set of contained inventory attribute data passes a threshold; and selecting the first destination container for placement of the inventory item based in part on cumulative distinctness value passing the threshold.

11. The method of claim 7, wherein the at least one physical attribute of the inventory item comprises at least two distinct physical attributes corresponding, respectively, to at least two different types of measurements selected from: item size, item color, item reflectivity, item shape, item text content, item text density, item compressibility, item weight, item density, item spectra, item thermal properties, or item acoustic density.

12. The method of claim 7, further comprising:

accessing the data store to retrieve item attribute data for a plurality of incoming inventory items that includes the incoming inventory item, the item attribute data indicative of at least one physical attribute of each of the incoming inventory items;

determining a plurality of item distinctness values for each contained inventory item with respect to each incoming inventory item by comparing the item attribute data for each incoming inventory item to the contained inventory attribute data corresponding to each contained inventory item;

determining respective cumulative distinctness values for each incoming inventory item with respect to the first destination container; and selecting the incoming inventory item for placement in the first destination container based in part on the cumulative distinctness value corresponding to the first destination container and incoming inventory item.

13. The method of claim 7, further comprising:

accessing the data store to retrieve item attribute data for a plurality of incoming inventory items that includes the incoming inventory item, the item attribute data indicative of at least one physical attribute of each of the incoming inventory items;

determining a plurality of item distinctness values for each contained inventory item with respect to each incoming inventory item by comparing the item attribute data for each incoming inventory item to the contained inventory attribute data corresponding to each contained inventory item;

determining respective cumulative distinctness values for each combination of the first and second destination containers with each incoming inventory item;

determining a maximum distinctness arrangement by determining a total distinctness value associated with each permutation of the combinations of first and second destination containers with each incoming inventory item; and selecting the first container for placement of the incoming inventory item based in part on the maximum distinctness arrangement.

14. The method of claim 7, wherein the item attribute data comprises a compilation of data representing multiple physical attributes, wherein the compilation is nonvarying when the inventory item is sensed from different orientations.

15. The method of claim 7, further comprising:

receiving a positive identifier corresponding to the inventory item; and retrieving the item attribute data of the incoming inventory item from the data store based on the positive identifier.

16. The method of claim 7, further comprising:

determining second destination container distinctness values for the incoming inventory item, each of the second destination container distinctiveness values being indicative of the distinctness of the incoming inventory items relative to a respective one of the inventory items stored in the second destination container;

excluding the second destination container as a candidate for placement of the inventory item based in part on a determination that at least one destination container distinctness value corresponding to the inventory items stored in the second destination container falls below a threshold.

17. An inventory system, comprising:

a first destination container a second destination container; and a management component comprising a processor and a tangible memory device storing non-transitory instructions executable by the processor to cause the processor to, at least:

obtain incoming item attribute data for an incoming inventory item indicative of at least two distinct physical attributes of the incoming inventory item;

access attribute data indicative of the at least one physical attribute for each inventory item stored in a first destination container;

access attribute data indicative of the at least one physical attribute for each inventory item stored in a second destination container;

determine first destination container distinctness values for the incoming inventory item, each of the first destination container distinctiveness values being indicative of the distinctness of the incoming inventory items relative to a respective one of the inventory items stored in the first destination container;

determine a first cumulative distinctness value for the incoming inventory item relative to the inventory items stored in the first destination container based on the first destination container distinctness values;

determine second destination container distinctness values for the incoming inventory item, each of the second destination container distinctiveness values being indicative of the distinctness of the incoming inventory items relative to a respective one of the inventory items stored in the second destination container;

determine a second cumulative distinctness value for the incoming inventory item relative to the inventory items stored in the second destination container based on the second destination container distinctness values;

select one of the first and second destination containers for placement of the inventory item based in part on one or more of the first and second cumulative distinctness values.

18. The inventory system of claim 17, further comprising a robotic manipulator configured to move inventory items, and wherein the executable instructions are further configured to cause the robotic manipulator to place the inventory item into the first destination container based on the destination container being selected for placement of the inventory item.

19. The inventory system of claim 17, wherein the executable instructions are further configured to cause the processor to:

exclude one of the first and second destination containers as a candidate for placement of the inventory item based on one of the item distinctness values corresponding to one of the first and second destination containers.

20. The inventory system of claim 19, wherein the executable instructions are further configured to cause the processor to:

after excluding the one of the first and second destination containers as a candidate, select a remaining destination container for placement of the inventory item by selecting the remaining potential destination container associated with a highest cumulative distinctness value.

21. The inventory system of claim 17, wherein the executable instructions are further configured to cause the processor to:

exclude one of the first or second destination containers as a candidate for placement of the inventory item based on the first or second cumulative distinctness value falling below a threshold.

22. The inventory system of claim 17, further comprising a sensor assembly configured to sense the at least two distinct attributes of the inventory item; and wherein the executable instructions are further configured to cause the processor to generate the item attribute data based on the sensed at least two distinct attributes.

* * * * *